G. C. THOMAS, Jr.
CONNECTING DEVICE.
APPLICATION FILED NOV. 21, 1919.
1,367,998.
Patented Feb. 8, 1921.
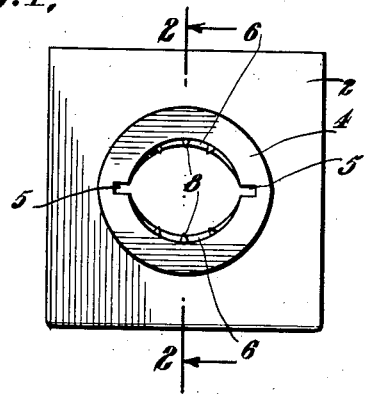
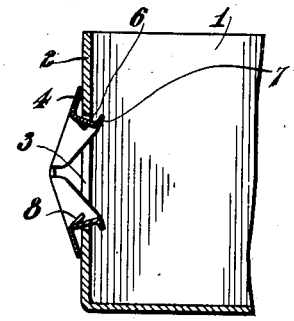
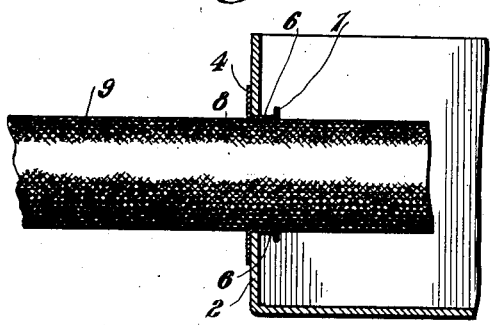
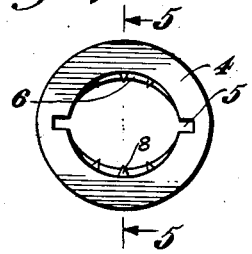
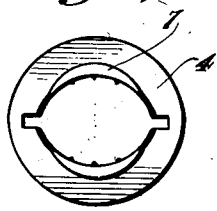
Inventor
George C. Thomas, Jr.
By his Attorney

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CONNECTING DEVICE.

1,367,998.      Specification of Letters Patent.      Patented Feb. 8, 1921.

Application filed November 21, 1919. Serial No. 339,574.

*To all whom it may concern:*

Be it known that I, GEORGE C. THOMAS, Jr., a citizen of the United States, residing at Elizabeth, in the county of Union and State of New Jersey, have invented certain new and useful Improvements in Connecting Devices, of which the following is a specification.

My invention relates to connecting devices which are used for connecting and securing conduits and the like to electrical outlet-boxes and the like. The invention is particularly applicable to the purpose of securing flexible fiber conduits or similar flexible conduits within the openings in outlet-boxes.

Outlet-boxes at present are commonly provided with open holes within which fixed metal eyelets are secured. These eyelets are provided with inwardly extending teeth which bite into and grip the outer covering of a flexible fiber conduit or the like. The eyelets referred to are fixed in position and the holes or openings are commonly left unclosed, it not being feasible to secure the usual knockouts in position with this construction.

In accordance with the present invention, all of the openings in the box are closed by knockouts which are removed when openings are required for connection. This is rendered possible by the construction of my improved connecting device which enables the latter to be mounted within the desired opening at the moment when a conduit is to be secured therein. I accomplish this by the provision of a metal annulus or the like, which is provided with a flange which is adapted to extend through the opening in the box, this flange having its end portion bent outwardly in a radial direction. The annulus is so arranged that it may be flexed in such a manner that the flange referred to may be inserted through the opening in the box, whereupon the annulus may be straightened out to cause it to lie approximately flat against the outer surface of the box wall with the main portion of the flange extending axially through the opening in the box with its end portion extending radially outwardly, so that the same may readily be pressed firmly into contact with the inner surface of the box wall. The main portion of the flange referred to is provided with teeth which will bite into and secure a flexible fiber conduit or the like when the latter is extended therethrough. The construction may conveniently be formed by causing the annulus to be readily flexible about a diametric line, the flange which is adapted to extend through the opening in the box consisting of two parts, one located on each side of the line about which the annulus bends. With this construction the annulus may readily be bent so as to approach the two flange portions toward each other into position to enable them readily to be passed through the opening.

In order that my invention may be more clearly understood, attention is hereby directed to the accompanying drawings forming part of this application and illustrating one form of my invention. In the drawings, Figure 1 represents a front elevation of an outlet box having an opening therein in which my improved connecting device is shown as partly inserted in the opening; Fig. 2 is a vertical section taken on line 2—2 of Fig. 1; Fig. 3 is a section similar to that shown in Fig. 2, with a flexible fiber conduit partially shown as inserted through the opening; Fig. 4 is a front elevation of the improved connecting device; Fig. 5 is a side elevation of the same; and Fig. 6 is a rear elevation of the connecting device.

Referring to the drawings, the outlet-box 1 is illustrated as having a front wall 2, which is provided with an opening 3 of oval or circular or other desired shape.

The connecting device comprises an annulus 4 formed of comparatively thin metal and so arranged as to be readily flexible about a diametric line or axis thereof. This may be conveniently accomplished by partially slitting through the annulus at opposite points, as is shown at 5, 5. It is, however, obvious that my invention is not limited to the use of this particular expedient. It may also be remarked that the annulus 4 is not necessarily formed of one integral piece, but may readily be formed of two or more pieces suitably secured together.

The annulus 4 is provided with a pair of flanges 6, 6, which extend in an axial direction from about the edges of the opening through the annulus, when the annulus is unflexed, so that it lies in a single plane. The flanges 6, 6, are situated on opposite sides of the axis of the annulus about which the latter is adapted to be bent. The flanges 6, 6, may, of course, be considered as a single flange which is interrupted at two points in alinement with the axis about which annulus 4 may be bent.

The flanges 6, 6, are provided at their ends with portions 7, 7, which are bent outwardly into approximate parallelism with the annulus 4. The main portion 6 of each flange is provided with teeth 8 which extend inwardly of the opening in the annulus a short distance and preferably incline in the direction of the interior of the box. The whole device may readily and inexpensively be punched from a single piece, the flange or flanges 6 being slit or pricked to form the teeth 8 as integral portions of the flange or flanges 6.

When a flexible fiber conduit or the like, such as is indicated at 9, is to be extended into and secured within the opening 3, the knockout in the opening is removed and an annulus 4 is bent somewhat into the position indicated in Fig. 2. The flanges 6 which extend at right angles to the annulus 4 will thereby be inclined toward each other sufficiently to enable the end flanges 7 to clear the edges of the opening 3 in the box wall 2, flanges 7 being sufficiently short to render this operation easy. The device is then positioned in the manner indicated in Fig. 2 with the flanges extending through the opening in the box.

The annulus 4 may then be pressed by the fingers into a straight position in which it lies substantially flush against the outer face of the wall 2, or the annulus may thus be straightened by the mere act of pushing the flexible fiber conduit 9 into position through the opening in the annulus, the conduit fitting within the flange 6 sufficiently snugly to press the latter into its axial position in which it engages closely within the opening 3 in the box wall. This operation will, of course, straighten the annulus 4 into a relation of parallelism with the box wall. The teeth 8 may be brought into biting engagement with the outer layer of the fiber conduit by drawing the latter backwardly a short distance. The end flanges 7 may then be pressed firmly into contact with the inner surface of wall 2, if desired.

It will be understood that my invention is not strictly limited to the exact details of construction described, but is as broad as is indicated by the accompanying claims.

What I claim is:—

1. In connecting devices, the combination of a wall having an opening therethrough and a disk having an opening therethrough with a flange about said opening, extending at right angles to said disk, with its end portion bent outwardly in a general radial direction, said disk being constructed and adapted to be flexed about a diameter thereof to permit the introduction of said flange through said wall opening, and then to be flexed in the opposite direction to cause said disk and flange end portion to extend outwardly from said wall opening on opposite sides of said wall and substantially parallel thereto, with the first named portion of said flange extending axially through said wall opening, said first named portion being constructed to grip a flexible fiber conduit or the like extending therethrough.

2. In connecting devices, the combination of a wall having an opening therethrough and a device adapted to be inserted in said opening when it is desired to insert and secure a flexible fiber conduit or the like therein, comprising a metal annulus having flanges of partial tubular character extending from about opposite sides of the opening of the annulus with end portions extending radially outwardly, said annulus being constructed and adapted to have its opposite side portions flexed in one direction about a diameter thereof to permit the introduction of said flanges through said wall opening, and to be flexed in the opposite direction about said diameter to cause said annulus and flange end portions to straighten out on opposite sides of said wall, said tubular flange portions having teeth adapted to engage a conduit extending therethrough.

3. In connecting devices, a member adapted to be mounted in and about an opening in an outlet-box wall, comprising a metal annulus, weakened on opposite sides thereof and thereby adapted to be flexed about a diameter thereof extending through the weakened points, said annulus having flanges about the opening in the annulus, on opposite sides of said diameter, extending in a general axial direction with their end portions bent outwardly in general radial directions, the axial portions of said flanges having means thereon to grip a flexible fiber conduit or the like extending therethrough.

4. In connecting devices, a member adapted to be mounted in and about an opening in an outlet-box wall, comprising a metal annulus constructed to facilitate flexure of the same about a diameter thereof, and having a flange about the opening in the annulus, on both sides of said diameter, extending in a general axial direction with its end portion bent outwardly in a general radial direction, the axial portion of said flange having means thereon to grip a flexible fiber conduit or the like extending therethrough.

This specification signed and witnessed this 19 day of November, 1919.

GEORGE C. THOMAS, Jr.

Witnesses:
ADNAH McMURTRIE,
H. VAN COTT HOLLAND.